(12) United States Patent
Yona et al.

(10) Patent No.: US 7,818,772 B2
(45) Date of Patent: Oct. 19, 2010

(54) SYSTEM AND METHOD FOR IMPROVING THE QUALITY OF VIDEO COMMUNICATION OVER A PACKET-BASED NETWORK

(75) Inventors: Ilan Yona, Tel Aviv (IL); Moshe Elbaz, Kiriat Bialik (IL)

(73) Assignee: Polycom, Inc., Pleasanton, CA (US)

( * ) Notice: Subject to any disclaimer, the term of this patent is extended or adjusted under 35 U.S.C. 154(b) by 1526 days.

(21) Appl. No.: 10/199,872

(22) Filed: Jul. 18, 2002

(65) Prior Publication Data

US 2003/0037337 A1 Feb. 20, 2003

Related U.S. Application Data

(60) Provisional application No. 60/306,204, filed on Jul. 18, 2001.

(51) Int. Cl.
*H04N 7/173* (2006.01)
(52) U.S. Cl. .......................................... 725/90; 725/127
(58) Field of Classification Search .................. 725/90, 725/127
See application file for complete search history.

(56) References Cited

U.S. PATENT DOCUMENTS

| | | | | |
|---|---|---|---|---|
| 4,935,816 A | * | 6/1990 | Faber | 348/578 |
| 5,821,984 A | | 10/1998 | Ito et al. | |
| 5,838,265 A | | 11/1998 | Adolph | 341/50 |
| 5,838,664 A | | 11/1998 | Polomski | |
| 5,889,945 A | | 3/1999 | Porter et al. | |
| 5,898,457 A | * | 4/1999 | Nagao et al. | 348/14.1 |
| 5,917,830 A | * | 6/1999 | Chen et al. | 370/487 |
| 5,936,662 A | | 8/1999 | Kim et al. | |
| 5,953,049 A | * | 9/1999 | Horn et al. | 348/14.09 |
| 5,982,415 A | | 11/1999 | Sakata | |

(Continued)

FOREIGN PATENT DOCUMENTS

EP    1 094 630 A2    4/2001

(Continued)

OTHER PUBLICATIONS

Search Report received in corresponding European application Serial 02751583.2; Nov. 23, 2004.

(Continued)

*Primary Examiner*—Christopher Kelley
*Assistant Examiner*—Franklin S Andramuno
(74) *Attorney, Agent, or Firm*—Wong, Cabello, Lutsch, Rutherford & Brucculeri, LLP (57) ABSTRACT

A system and method for improving quality of video communication includes a packets generator logical unit (PGU) coupled to a video source for receiving a compressed video stream and generating primary and secondary data chunks for transmittal to one or more destination nodes via a network. Each primary data chunk is associated with a secondary data chunk, and each secondary data chunk includes video data that covers a same portion of a video frame as video data included in each associated primary data chunk. The PGU encapsulates the primary and secondary data chunks in associated primary-secondary packet pairs composed of MB data fields, picture header fields, GOB and slice start header fields, and MB header fields, among others. The destination nodes process the secondary packets received via the network if the primary packets are damaged or lost in transmission.

40 Claims, 8 Drawing Sheets

U.S. PATENT DOCUMENTS

| | | | |
|---|---|---|---|
| 5,990,933 A | | 11/1999 | Ozone et al. |
| 5,991,277 A | | 11/1999 | Maeng et al. |
| 6,006,253 A | | 12/1999 | Kumar et al. |
| 6,025,870 A | | 2/2000 | Hardy |
| 6,078,328 A | * | 6/2000 | Schumann et al. .......... 345/418 |
| 6,104,757 A | * | 8/2000 | Rhee ..................... 375/240.12 |
| 6,122,259 A | | 9/2000 | Ishida |
| 6,141,448 A | | 10/2000 | Khansari et al. ............ 382/236 |
| 6,175,573 B1 | | 1/2001 | Togo et al. |
| 6,317,462 B1 | * | 11/2001 | Boyce ................... 375/240.27 |
| 6,377,573 B1 | * | 4/2002 | Shaffer et al. ............... 370/356 |
| 6,400,767 B1 | * | 6/2002 | Nuber et al. ........... 375/240.26 |
| 6,421,387 B1 | * | 7/2002 | Rhee ..................... 375/240.27 |
| 6,611,530 B1 | * | 8/2003 | Apostolopoulos ........... 370/442 |
| 6,629,318 B1 | * | 9/2003 | Radha et al. ................ 725/134 |
| 6,680,976 B1 | * | 1/2004 | Chen et al. ............. 375/240.26 |
| 6,757,735 B2 | * | 6/2004 | Apostolopulos et al. .... 709/231 |
| 2001/0009547 A1 | * | 7/2001 | Jinzaki et al. ............... 370/390 |
| 2002/0116715 A1 | * | 8/2002 | Apostolopoulos ............ 725/86 |
| 2002/0152440 A1 | | 10/2002 | Yona |

FOREIGN PATENT DOCUMENTS

| | | |
|---|---|---|
| EP | 1094630 A2 * | 4/2001 |
| WO | WO 99/05602 A1 | 2/1999 |
| WO | WO 00/78000 A2 | 12/2000 |

OTHER PUBLICATIONS

Petter Tiilikainen; "SIP (RFC 2543), an Implementation for Marratech Pro;" Apr. 2000; Luleå University of Technology, Luleå Sweden.

M. H. Willebeek-LeMair, et al. "On Multipoint Control Units for Videoconferencing;" Mar. 1994; IBM T. J. Watson Research Center.

* cited by examiner

SYSTEM AND METHOD FOR IMPROVING THE QUALITY OF VIDEO COMMUNICATION OVER A PACKET-BASED NETWORK

CROSS-REFERENCE TO RELATED APPLICATION

This application relates to and claims priority from U.S. Provisional Patent Application No. 60/306,204 filed Jul. 18, 2001, entitled "An Apparatus and a Method for Improving the Quality of Video Communication Over a Packet-Based Network." The subject matter of the related application is hereby incorporated by reference.

BACKGROUND OF THE INVENTION

1. Field of the Invention

This invention relates generally to video communication over a packet-based network, and relates more particularly to a system and method for improving the quality of video communication.

2. Description of the Background Art

Video communication over packet-based networks such as Internet protocol (IP) networks use a variety of communication protocols. For example, H.323 is one member of a family of real-time communication protocols approved by the International Telecommunication Union (ITU). Each protocol in the family addresses a different underlying network architecture, such as, but not limited to, a circuit switched network, a local area network (LAN) with quality of service (QoS), and a LAN without QoS. H.323 defines how audiovisual conferencing data is transmitted across packet-based networks. H.323 is not an individual protocol, but rather a vertically-integrated suite of protocols that defines every component of a conferencing network: endpoints, gateways, gatekeepers, multi-point control units (MCUs), and other feature servers. For example, H.323 uses a call setup protocol (Q.931), a call signaling protocol (H.225), and a protocol for exchanging terminal capabilities and creation of media channels (H.245).

Another example of a video communication protocol in IP networks is a Session Initiated Protocol (SIP). SIP is a signaling protocol for Internet conferencing, telephony, events notification, and instant messaging. The protocol initiates call setup, routing, authentication, and provides other control features between endpoints within IP networks. SIP is more or less equivalent to the Q.931 and H.225 components of H.323.

Packet-based networks, using SIP or H.323 protocols, for example, do not offer an end-to-end connection with a guarantee that all packets will reach their destination. However, packet-based networks may implement additional protocols to reduce lost packet error rates. For example, E-Mail applications use transmission control protocol/Internet protocol (TCP/IP). TCP/IP is a connection-based protocol that verifies arrival of packets at a destination node. If a packet does not arrive at the destination node, TCP/IP may send a request to the source node for re-transmittal of the lost packet. User datagram protocol/Internet protocol (UDP/IP) is a connectionless protocol that runs on top of IP networks. However, UDP/IP provides very few error recovery services, unlike TCP/IP. UDP/IP is used primarily for broadcasting messages over a network without first establishing an endpoint-to-endpoint connection, and lost packets are typically handled by endpoint applications.

Since video communication occurs in real-time, any delay in video data propagation time over an IP network may reduce the quality of the video communication received and processed by the endpoints. A handshake protocol like TCP/IP increases delays, particularly when dealing with lost packets, and degrades the video communication. Therefore, video communication using H.323, SIP, or similar protocols will normally also use UDP/IP. However, since UDP/IP does not have an internal mechanism for lost packet recovery, some of the packets may never reach their destination. Typically, video communication using UDP/IP loses 0-10% of transmitted packets.

In addition to the various communication protocols, video communication uses various video compression standards such as H.261 and H.263, among others. Two types of frames are defined under these compression standards: non-referential frames such as Intra (I) frames, and referential frames (typically referred to as non-Intra frames), such as Inter frames, B frames, PB frames, and P frames, among others. A referential frame generally includes an image difference between a current frame and a previous known frame. A frame is composed of an array of Macro Blocks (MBs). Each MB is comprised of an array of pixels, and typically a MB is composed of a 16×16 pixel array. The endpoints encode, decode, and send video communications over the IP network as packets, and each packet includes an integer number of MBs. Further, the packet may include a whole frame or part of a frame.

Since endpoint video encoding/decoding is based on referential information between non-Intra frames, loss of a packet might damage the video quality for all frames subsequent to the lost packet until a new Intra frame arrives at a destination endpoint, also referred to as a destination node. Loss of packets may also cause loss of video synchronization at the destination node. The usual way a video decoder at the destination node handles lost or damaged packets is by signaling a source node to send an entire Intra frame if a packet has been lost, or signaling the source node to send a part of the Intra frame if the packet has been damaged. A corrupted portion of the damaged packet can be reconstructed using an associated part of the Intra frame. The signaling may be done outside of the video communication band as defined in the H.225 signaling protocol, for example. While waiting for the next Intra frame, the endpoints generally freeze the display. Furthermore, frequent Intra frame transmission introduces disruptive video quality. Consequently, frequent loss of video synchronization in an endpoint-to-endpoint connection causes the video images received at the endpoints to be poor in quality.

Video quality may be further degraded when a network uses a MCU node to allow two or more endpoints to participate in a multimedia communication session. The MCU node increases the complexity of handling lost packets over the network.

There are few known ways in the audiovisual communication art by which a network node handles missing packets in a manner that does not degrade transmitted audiovisual images. Particularly, there are few methods by which a source node generates redundant information to enable a destination node to replace or rebuild missing or damaged packets. In addition, these prior art methods require either that both the source node and destination node communicate via a handshake procedure, or that the destination node be specifically modified to handle missing packets. Therefore, there is a need for a system and a method to better handle missing or damaged packets while maintaining high quality video images.

SUMMARY OF THE INVENTION

The present invention is a system and method for improving quality of video communication. The system comprises a packets generator logical unit (PGU) coupled to a video source for receiving a compressed video stream. According to the present invention, the PGU processes the compressed video stream to generate a stream of primary data chunks and a stream of secondary data chunks. Each primary data chunk is associated with a secondary data chunk, and each secondary data chunk includes video data that covers a same portion of a video frame as video data included in each associated primary data chunk. In addition, the PGU generates packets out of the stream of primary data chunks and the stream of secondary data chunks.

The video data, which is encapsulated in a secondary data chunk, may include the same data of the associated primary data chunk, or a portion of this data. The data encapsulated in the secondary data chunk includes, at a minimum, enough data to enable a decoder at a destination node to maintain video synchronization when primary packets are lost. For example, headers of the video data that maintain video synchronization at the decoder may be added to the secondary data chunk. In other cases, additional data may be added to the secondary data chunk, such as data to enable the decoder at the destination node to refresh its display. For example, motion vector (MV) data may be added to the secondary data chunk. Data may be added to the secondary data chunk up to a situation where the secondary data chunk has the same data as the associated primary data chunk.

In one embodiment of the invention, the PGU adds identification data to each primary data chunk and to each secondary data chunk. A primary data chunk and its associated secondary data chunk receive the same identification data. The identification data include sequence numbers and/or time stamps.

Each secondary data chunk is delayed with respect to its associated primary data chunk. The delay may be a period T or an integer number "k" of primary data chunks. Typically, the delay period T is a percentage of a jitter period as measured at the destination nodes. The jitter period is a time period that a destination node allows a jitter buffer to receive packets. Usually the destination node sends information (such as the jitter period) to the source node via a Real-Time Transport Control Protocol (RTCP) report. In an alternate embodiment of the invention, the delay period T is fixed.

If the delay is specified by an integer number "k" of primary chunks, "k" depends upon a communication bit rate and a size of the jitter buffer. Typically, "k" is in the range of a few data chunks. In another embodiment of the present invention, the source and the destination nodes collectively define the value of "k." In yet another embodiment, the value of "k" may be changed during a video communication.

The present invention generates packets from the primary data chunks and delayed secondary data chunks, and sends the packets to one or more destination nodes via a packet-based network. In one embodiment of the present invention, a payload of each packet is either a primary data chunk or a delayed secondary data chunk. In another embodiment, each packet is a compound packet. The payload of each compound packet is composed of a primary data chunk and a delayed secondary data chunk. The delayed secondary data chunk is associated with another primary data chunk that is previously sent in an earlier compound packet to the one or more destination nodes. In other words, the payload of each compound packet is composed of a primary data chunk and a non-associated delayed secondary data chunk.

A packet having a primary data chunk is referred to as a primary packet (PP) and a packet having a secondary data chunk as a secondary packet (SP). Furthermore, two packets are referred to as associated primary packet-secondary packet pair if the payload of the primary packet of the pair includes a primary data chunk that is associated with the secondary data chunk that is included in the payload of the secondary packet of the pair.

In embodiments of the present invention that use compound packets composed of a primary data chunk and a delayed secondary data chunk, each compound packet contains a header having information regarding the beginning and the end of the delayed secondary data chunk, data of the delayed secondary chunk with its identification data, and data of the primary chunk with its identification data. This exemplary embodiment improves traffic over communication lines since it eliminates the overhead that is associated with non-compound packets. However, this exemplary embodiment requires that the destination node is configured to receive and process the header and payload of the compound packet, and to separate the compound packet into two packets for delivery to the jitter buffer for further processing.

The delay is generally selected to accomplish two tasks at the destination node: to increase the probability that a destination node's jitter buffer receives a primary packet having a primary data chunk before receiving its associated secondary packet having an associated secondary data chunk, and to increase the probability that the secondary packet reaches the jitter buffer before a declaration that the packet has been lost.

Typically, the destination node processes the first packet of an associated primary packet-secondary packet pair received and stored in the jitter buffer. The first packet received and stored in the jitter buffer normally is the PP having the primary data chunk. However, if the PP packet is lost or damaged during transmission from the PGU, the destination node then processes the SP having the secondary data chunk, which is associated with the lost or damaged PP.

In other exemplary embodiments, the functionality of the PGU may be replaced by a source node encoder. In such embodiments there is no need to parse the compressed video stream in order to generate the primary and the secondary data chunks.

In another embodiment of the invention, the PGU monitors the state of a secondary packet enable (SPE) line. If the line is in a high (true) state, for example due to lossy network connections or a high primary packet loss rate as measured at the destination nodes, then the PGU generates a secondary data chunk for each primary data chunk generated. The situation of the network connections is monitored and sent to the source via RTCP reports by the destination node. If the line is in a low (false) state, then the PGU generates only the primary data chunks. In an alternate embodiment of the invention, if the SPE line is in a high state, the PGU generates a secondary data chunk for one or more selected primary data chunks, where the selected primary data chunks are not necessarily sequential.

In a further embodiment, the present invention comprises a method for improving quality of a video communication, using the steps of: receiving a video data stream, parsing fields from the video data stream for field type, generating secondary data chunks and associated primary data chunks based on the field type, delaying each secondary data chunk with respect to its associated primary data chunk, building primary packets and associated delayed secondary packets from the primary data chunks and associated delayed secondary data chunks, respectively, sending the primary packets and the associated delayed secondary packets to one or more destination nodes, and processing the delayed secondary packets for use in the video communication if the associated primary packets are not received by the destination nodes. The present invention processes, among other field types, MB data fields, picture header fields, GOB and slice header fields, and MB header fields to generate the secondary and associated primary data chunks.

Other objects, features, and advantages of the present invention will become apparent upon reading the following detailed description of the exemplary embodiments with the accompanying drawings and appended claims.

DETAILED DESCRIPTION OF THE DRAWINGS

Referring now to the drawings, in which like numerals refer to like parts, exemplary embodiments of the present invention are described. For convenience, only some elements of the same group may be labeled with numerals. The purpose of the drawings are to illustrate exemplary embodiments and are not meant to limit the scope of the invention.

Figure 1:
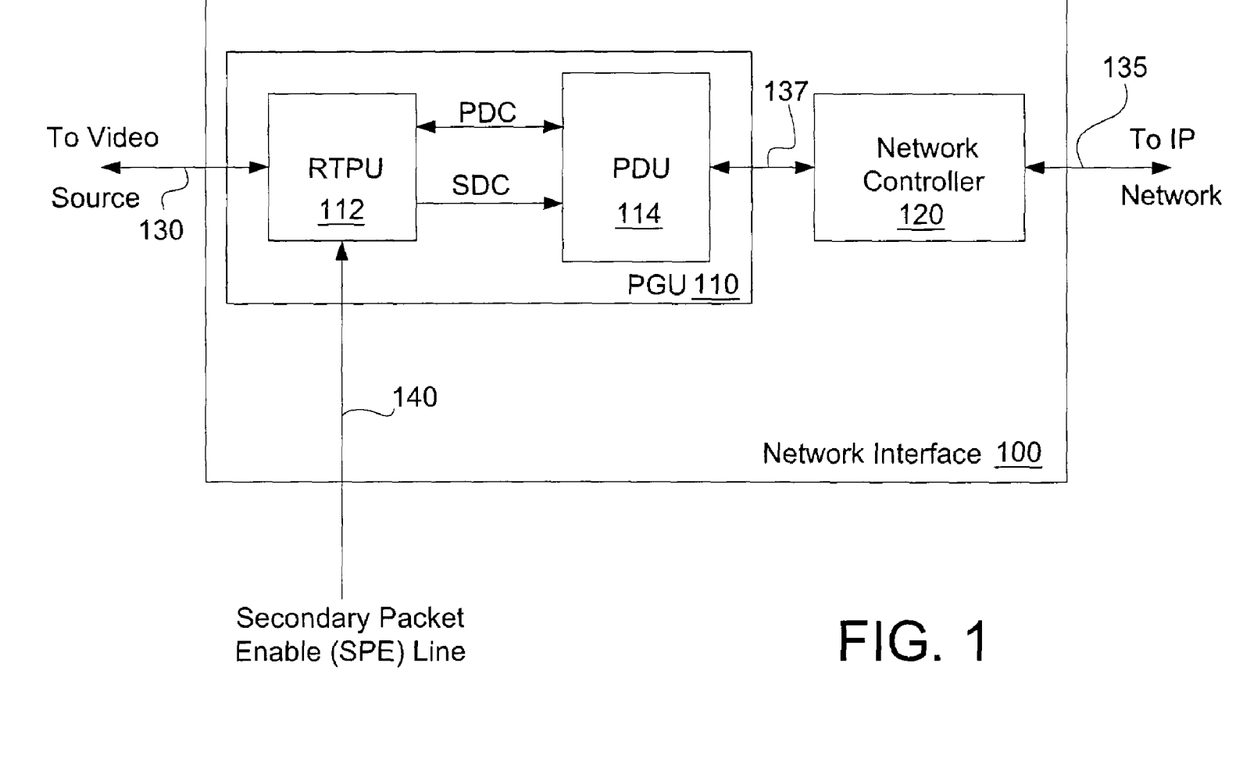
FIG. 1 is a block diagram of one embodiment of a network interface, according to the present invention.

FIG. 1 is a block diagram of one embodiment of a network interface 100, according to the present invention. The network interface 100 includes a packets generator logical unit (PGU) 110 and a network controller 120. The network controller 120 controls communication over a packet-based network that may be used for video communication over a local area network (LAN), a wide area network (WAN), an Intranet, and an Internet, among other network types. The network interface 100 may be located in a video source or a network node, such as an endpoint, a multipoint control unit (MCU), or a multimedia gateway, among others. The endpoint is any physical entity or apparatus that generates and/or receives information streams, such as audiovisual data streams.

Although the FIG. 1 embodiment of the PGU 110 is located in the network interface 100, the scope of the present invention covers the PGU 110 located anywhere within a video source or a network node. For example, an encoder module located within a video source that compresses video data may also function as the PGU 110. The PGU 110 includes a real time protocol logical unit (RTPU) 112 and a packet delivery unit (PDU) 114. The PDU 114 will be discussed in more detail in connection with FIG. 2.

In operation, the RTPU 112 receives a compressed video stream from the video source via line 130. As will be discussed further below in conjunction with FIG. 3, the RTPU 112 parses the received video stream and generates two streams of data chunks, a primary data chunk (PDC) stream and a secondary data chunk (SDC) stream. The RTPU 112 segments the compressed video stream into data chunks such that each PDC comprises an integer number of Macro Blocks (MBs). A maximum PDC size is based on the communication protocol used by a packet-based IP network (not shown) coupled to the network controller 120 via a line 135. For example, when packets are transmitted onto the IP network (not shown) via the line 135 using a UDP/IP-H.323 communication standard, the maximum packet size is 1500 Bytes and this communication standard determines the maximum size of a PDC. In addition, each PDC is limited to include video data from a single video frame or a fraction of the single video frame.

Each SDC of the SDC stream is associated with a PDC of the PDC stream. In other words, both chunks of an associated primary-secondary data chunk pair define the same video frame or the same portion of the video frame. Each associated pair has the same "start bit" and the same "end bit" value. Having the same bit values enables accurate stitching of the SDC to the video stream that is constructed from the PDC, in case the PDC is lost. Information about "start bits" and "end bits" can be found in an RTP standard. Typically, the RTPU 112 uses patterns of MB staffing in the SDC to incorporate the same "start bits" and "end bits" in each associated pair. However in compressed video, which is based on H.263, the length of the MB staffing pattern is even. Therefore, in cases where the parity of the SDC is not the same as its associated PDC, using staffing of MBs is not sufficient. In such cases additional information may be added to the last MB in the SDC. The additional information may include manipulated MVD and/or manipulated DCT. The methods by which the RTPU 112 generates PDCs and SDCs are discussed further below in conjunction with FIGS. 4-7B.

The RTPU 112 forwards the PDC stream and the SDC stream to the PDU 114. Subsequently, the PDU 114 adds a sequence number and a time stamp to each PDC and each SDC, where primary and secondary data chunks in an associated primary-secondary data chunk pair receive the same sequence number and the same time stamp. Further, the PDU 114 generates a primary packet (PP) from each PDC, and sends each PP to the network controller 120 via a line 137. Further in parallel to processing each PDC, the PDU 114 delays each SDC in reference to its associated PDC, generates a secondary packet (SP) from each delayed SDC, and sends the SP to the network controller 120 via the line 137. The network controller 120 then sends the combined stream of primary packets and delayed secondary packets onto the IP network for delivery to their destination nodes (not shown). The destination nodes may be other endpoints or a MCU, for example. Operation of the network controller 120 is based upon the communication standard used by the IP network and is well known in the art.

The above exemplary embodiment of the present invention creates individual packets for each type of data chunk. For example, the present invention creates one packet (a primary packet) from a PDC and another packet (a secondary packet) from an SDC. Although the creation of individual packets occur in the source node, and is independent of destination node configuration, the present invention requires additional overhead that is associated with creating the individual primary and secondary packets.

In an alternate embodiment of the present invention, the PGU 110 generates compound packets for transmission to the one or more destination nodes. A compound packet includes both a PDC and a delayed SDC. The delayed SDC is associated with another PDC previously sent to the one or more destination nodes in an earlier generated compound packet. The PDC and the delayed SDC that are in the same compound packet are not associated with each other. In other words, the payload of each compound packet is composed of a primary data chunk and a non-associated delayed secondary data chunk. However, a first and a second compound packet are referred to as an associated compound packet pair if the second compound packet includes a delayed SDC that is associated with a PDC that is included in the first compound packet. In this alternate embodiment, before generating a new PDC, the RTPU 112 requests information from the PDU 114 about the delayed SDC that would be combined with the new PDC in a compound packet. This information is used by the RTPU 112 in deciding where to terminate the new PDC. Then the RTPU 112 delivers the new PDC and its associated SDC to PDU 114. The PDU 114 adds identical ID data (e.g., a sequence number and/or a time stamp) to each PDC and its associated SDC. The PDU 114 then delays each SDC in reference to its associated PDC by a period of time "T" or by an integer number "k" of PDCs, builds a compound packet comprising a delayed SDC and a non-associated PDC, and delivers the compound packet to the network controller 120 over line 137. The compound packet is discussed in more detail below in conjunction with FIG. 2. Subsequently, the network controller 120 sends the compound packets onto the IP network for delivery to the destination nodes (not shown). The destination nodes may be other endpoints or a MCU, for example. The destination node is configured to receive and process the compound packets accordingly.

In one embodiment of the present invention, a secondary packet enable line 140 is coupled to the RTPU 112 for controlling the generation of the secondary data chunks. The secondary packet enable line 140 may be controlled by network node hardware or software, or by a network node user. For example, when the secondary packet enable line 140 is in a high (true) state, the RTPU 112 generates a secondary data chunk for each generated primary data chunk. However, when the secondary packet enable line 140 is in a low (false) state, the RTPU 112 does not generate any secondary data chunks. The state of the secondary packet enable line 140 may be based upon IP network traffic conditions, primary packet loss rates as measured at the destination node, or other network parameters. The network parameters may be sent to the source node via a RTCP report.

Operation of the network interface 100 may be bi-directional. For example, the network interface 100 may receive packets from the IP network, and generate compressed video, audio, and data streams to be used by internal circuits (not shown) of the network node associated with the network interface 100. However, when the network interface 100 receives packets from the IP network, the PDU 114 is non-operational and the RTPU 112 performs its regular task of parsing incoming packets.

Figure 2:
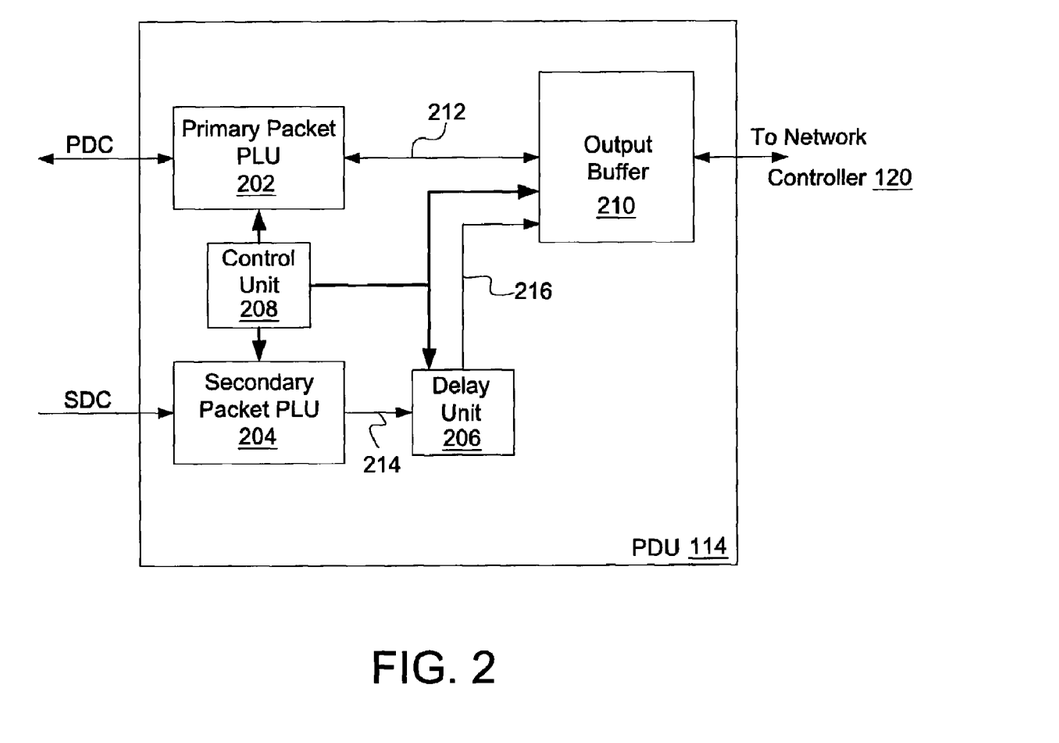
FIG. 2 is an exemplary block diagram of the PDU of FIG. 1.

FIG. 2 is an exemplary block diagram of the PDU 114 of FIG. 1, according to the present invention. The exemplary PDU 114 may include a primary packet processing logical unit (PLU) 202, a secondary packet PLU 204, a delay unit 206, a control unit 208, and an output buffer 210.

Preferably, the primary packet PLU 202 receives PDCs via the PDC stream and adds ID data to each received PDC. The ID data may include a primary sequence number and/or a primary time-stamp. The ID data (primary sequence numbers and/or time-stamps) are received from the control unit 208 by the primary packet PLU 202. The primary packet PLU 202 then sends each PDC to the output buffer 210 via line 212.

If the RTPU 112 (FIG. 1) is enabled via the secondary packet enable line 140 (FIG. 1) to generate secondary data chunks, then the secondary packet PLU 204 receives SDCs via the SDC stream. Each SDC received by the secondary packet PLU 204 is associated with a PDC received by the primary packet PLU 202. The secondary packet PLU 204 then adds a secondary sequence number and a secondary time stamp to each SDC of the SDC stream. The secondary packet PLU 204 receives the secondary sequence numbers and time-stamps from the control unit 208. For a given associated primary-secondary data chunk pair, the primary and secondary sequence numbers are identical, and the primary and secondary time stamps are identical.

The secondary packet PLU 204 then sends each SDC to the delay unit 206 via line 214. The delay unit 206 delays each SDC with reference to its associated PDC, and then sends each delayed SDC to the output buffer 210 via line 216. The control unit 208 controls the output buffer 210 and the delay unit 206, and may control the delay used by the delay unit 206. For example, the control unit 208 may define the delay. The delay is generally selected to accomplish two tasks at the destination node: to increase the probability that a destination node's jitter buffer receives a primary packet having a PDC before receiving an associated secondary packet having an associated SDC; and in the event that the primary packet is lost, to increase the probability that the secondary packet reaches the jitter buffer before a declaration that the primary packet is lost.

The delay may be a delay period T defined as a percentage of a destination node's jitter period. Typically, jitter periods vary between 10 to 100 milliseconds. It should be noted that any jitter period and delay period T may be utilized. In one embodiment of the invention, the PGU 110 may request a destination node's jitter period using the RTCP reports. The RTCP reports are part of H.323. In another embodiment, the control unit 208 may specify a constant delay period T, independent of the destination node's jitter period or network line conditions.

In other embodiments, the delay may be an integer number "k" of PDCs. Typically, the integer number "k" depends upon the communication speed and the size of the jitter buffer. Generally, "k" may be in the range of a few primary data chunks. In alternate embodiments of the invention, the value "k" may be determined by only the source node, the value "k" may be determined by both the source and the destination nodes, or the value "k" may be changed during a video communication.

In one embodiment of the invention, the output buffer 210 receives the PDCs and the delayed SDCs and delivers them as separate packets over a combined stream 137 to the network controller 120 (FIG. 1). Subsequently, the network controller 120 sends the combined stream of packets onto the IP network for delivery to the destination node's jitter buffer. The destination node's software and/or hardware then processes the primary and secondary packets received over the IP network and stored in the jitter buffer. If the jitter buffer contains an associated primary packet-secondary packet pair, then the destination node may ignore the second packet to arrive and processes the first packet to arrive. Usually the first packet to arrive is the primary packet. However, if only the secondary packet of the associated primary packet-secondary packet pair is received over the IP network and stored in the jitter buffer, then the destination node processes the secondary packet.

In an alternate exemplary embodiment of the present invention, the output buffer 210 is a logical module that builds a compound packet from components of a PDC and a delayed SDC. Output buffer 210 may place the header of the PDC as the RTP header of the compound packet while modifying the length of the compound packet payload to include the length of an attached SDC with its Codec Specific Extension (CSE). The CSE may include information such as, but not limited to, "start bit" and "end bit," among others. More information about the CSE may be found in the standards. An exemplary compound packet may have the following structure: RTP header, which is the header of the PDC, followed by the CSE of the PDC, followed by the payload of the compound packet. An exemplary payload of the compound packet may start with a length of the SDC followed by the CSE of the SDC, the payload of the SDC, and the payload of the PDC. The output buffer 210 sends the compound packet onto the IP network for delivery to the destination node via the network controller 120 (FIG. 1). The destination node, which is configured to process the compound packet, parses the compound packet based on the RTP header and the length of the SDC. Using a sequence number "n" of the compound packet, which is part of the RTP header, and using the value of "k" (the number of delayed packets), the destination node calculates a sequence number "n–k" of the SDC. Subsequently, the destination node determines whether a compound packet with the sequence number "n–k" has arrived. If the compound packet with the sequence number "n–k" has arrived, the destination node ignores the SDC portion in the payload of the compound packet "n" and processes only the PDC portion of compound packet "n–k." If the compound packet number "n–k" has not arrived, the destination node may process the video data of the SDC in the payload of compound packet "n" instead of the PDC of compound packet "n–k."

Figure 3:
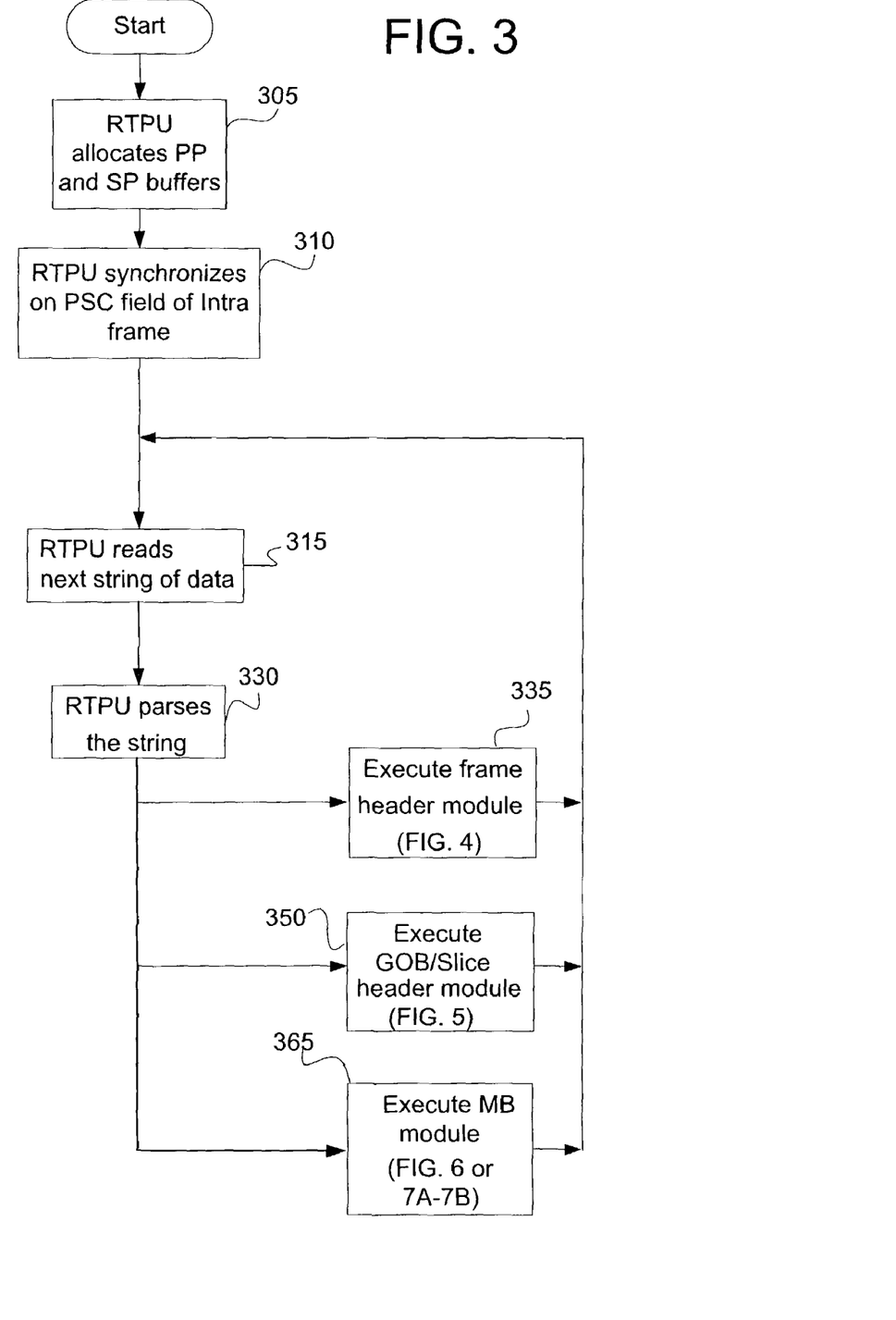
FIG. 3 is a flow diagram of method steps for generating secondary data chunks and primary data chunks, according to one embodiment of the present invention.

FIG. 3 is a flow diagram of method steps for selecting and executing modules, based on string types, to create secondary data chunks and primary data chunks, according to one embodiment of the present invention. In step 305, the RTPU 112 (FIG. 1) allocates primary packet and secondary packet buffers. Next, the RTPU 112 receives a compressed video data stream from a video source via the line 130 (FIG. 1), and waits until a Picture Start Code (PSC) field of an Intra frame is received in step 310. Once received, the RTPU 112 synchronizes on the PSC of the Intra frame. Subsequently in step 315, the RTPU 112 reads the next string of data, parses the string of data in step 330, and based upon the parsing operation, selects execution module 335, 350, or 365 for processing the string. The parsing operation of the RTPU 112 in step 330 is based upon a compression standard of the video data stream. For example, the present invention supports H.261 and H.263 video data compression standards, among others.

If, in step 330, the parsing operation determines that the string contains a picture header string, then the RTPU 112 executes a frame header module for generating the primary and secondary data chunks in step 335, and the RTPU 112 reads the next string of data in step 315. The method steps for the frame header module are discussed further below in conjunction with FIG. 4.

If, in step 330, the parsing operation determines that the string contains GOB or Slice header data, then the RTPU 112 executes a GOB/Slice header module in step 350, and the method continues at step 315. The method steps for the GOB/Slice header module are discussed further below in conjunction with FIG. 5.

Finally, if in step 330 the parsing operation determines that the string contains a MB string of data, then in step 365 the RTPU 112 executes one of two MB modules for generating the primary and secondary data chunks, and the method continues at step 315. For example, if the compression standard is H.261, then the RTPU 112 executes a MB module associated with the H.261 compression standard. Execution of the MB module associated with the H.261 compression standard is discussed further below in conjunction with FIG. 6. Alternatively, if the compression standard is H.263, then the RTPU 112 executes a MB module associated with the H.263 compression standard. Execution of the MB module associated with the H.263 compression standard is discussed further below in conjunction with FIGS. 7A-7B.

Figure 4:
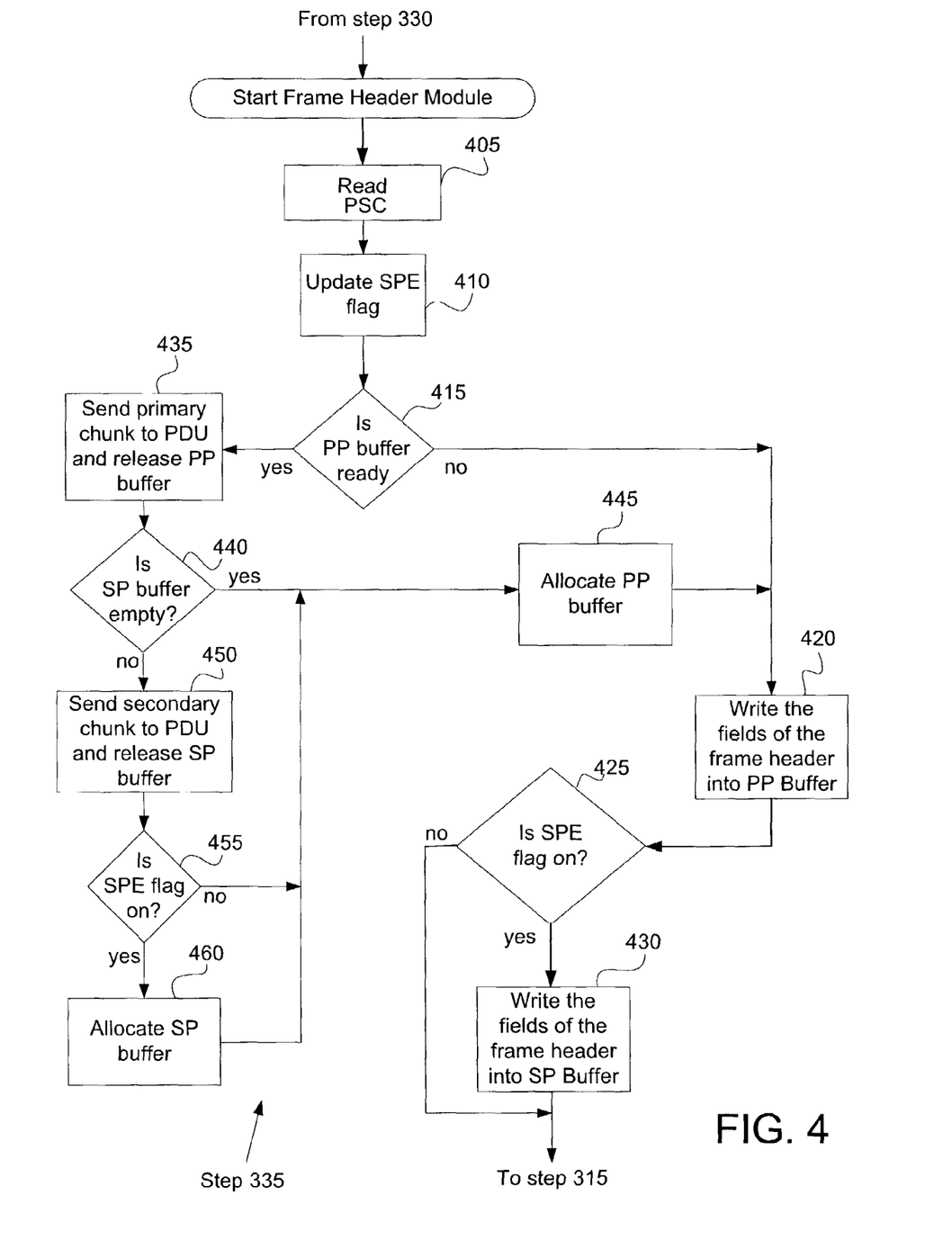
FIG. 4 is an exemplary flow diagram of method steps for executing the Frame Header Routine of FIG. 3 for generating the secondary and primary data chunks, and sending the data chunks to the PDU of FIG. 1.

FIG. 4 is a flow diagram of method steps for executing the frame header module (step 335 of FIG. 3) in order to generate the secondary and primary data chunks, and sending the data chunks to the PDU 114 (FIG. 1), according to one embodiment of the present invention. Initially in step 405, the RTPU 112 (FIG. 1) reads the PSC field. Then in step 410, the RTPU 112 updates an SPE indication flag by sampling the SPE line 140 (FIG. 1). If the SPE line 140 is high (true), then the RTPU 112 turns the SPE indication flag "on." If the SPE line 140 is low (false), then the RTPU 112 turns the SPE indication flag "off" upon sampling the SPE line 140. However, if in step 410, the PSC belongs to an Intra frame, the present invention does not generate a secondary data chunk, and therefore the RTPU 112 disables the SPE flag (turns the SPE flag "off"). As will be discussed further below in conjunction with steps 425 and 455, the fields of the frame header are not written to a secondary packet buffer when the SPE flag is "off," as is the case when the RTPU 112 processes PSC fields from Intra frames, for example.

Subsequently in step 415, the RTPU 112 determines if a primary packet (PP) buffer is ready to be sent. Usually, a packet is ready to be sent in two cases. In the first case, the packet is ready to be sent when it is on a boundary of a GOB/Slice or a boundary of a MB and the number of bytes in the PP buffer is close to the standard set by the communication protocol (e.g. 1500 bytes). In the second case, the packet is ready to be sent at the end of a video frame. Typically, when the RTPU 112 reads a first PSC field after synchronizing on the PSC field of the Intra frame (step 310, FIG. 3), the primary packet buffer is empty and is not ready to be sent. Consequently the routine continues at step 420. However, when the RTPU 112 reads other PSC fields after synchronization, the primary packet buffer has data and the routine continues at step 435. Referring back to step 415, if the PP buffer is not ready, then in step 420, the RTPU 112 writes the fields of the frame header to the PP buffer, and the RTPU 112 determines in step 425 if the SPE flag is "on." If the SPE flag is "on," then in step 430, the RTPU 112 writes the fields of the frame header to the secondary packet buffer, and the routine continues at step 315 in FIG. 3. However if in step 425 the SPE flag is "off," then step 430 is bypassed, and the routine continues at step 315.

Referring back to step 415, if the RTPU 112 determines that the primary packet buffer is ready to be sent, then in step 435, the RTPU 112 sends the primary data chunk stored in the primary packet buffer to the PDU 114 (FIG. 1), and releases the allocated primary packet buffer. Next in step 440, the RTPU 112 determines if the secondary packet buffer is empty. If the secondary packet buffer is empty, the RTPU 112 allocates a new primary packet buffer in step 445. Subsequently in step 420, the RTPU 112 writes the fields of the frame header to the newly allocated primary packet buffer. The routine continues with step 425 as previously discussed. Alternatively if, in step 440, the secondary packet buffer is not empty, then in step 450, the RTPU 112 sends the secondary data chunk stored in the secondary packet buffer to the PDU 114, and then releases the allocated secondary packet buffer.

Next, in step 455, the RTPU 112 determines if the SPE flag is "on." If the SPE flag is not "on," then the routine continues at step 445. However if in step 455 the SPE flag is "on," then in step 460, the RTPU 112 allocates a new secondary packet buffer and sets the start bit to be equal to the start bit of the associated PDC. Subsequently, the routine continues at step 445.

Figure 5:
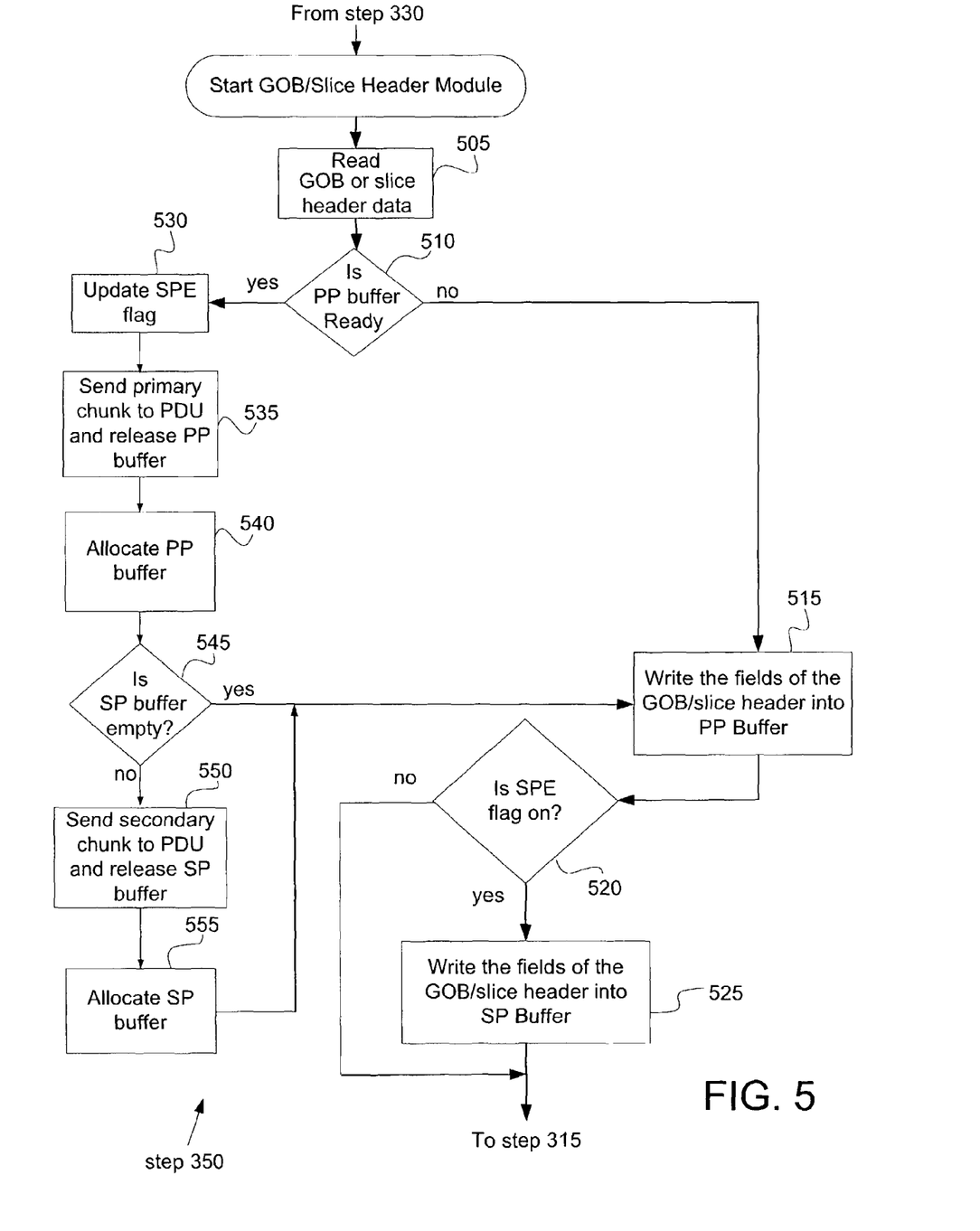
FIG. 5 is an exemplary flow diagram of method steps for executing the GOB/Slice Header Routine of FIG. 3 for generating the secondary and primary data chunks, and sending the data chunks to the PDU of FIG. 1.

FIG. 5 is an exemplary flow diagram of method steps for executing the GOB/Slice Header module (GSHM) 350 of FIG. 3 for generating the secondary and primary data chunks, and sending the data chunks to the PDU 114 (FIG. 1), according to the present invention. In step 505, the RTPU 112 (FIG. 1) reads GOB header data (also referred to as GOB header fields) or slice header data (also referred to as slice header fields), depending on the mode of operation. The RTPU 112 then determines in step 510 if the primary packet buffer is ready to be sent.

If in step 510, the primary packet buffer isn't ready to be sent, then in step 515, the RTPU 112 writes the fields of the GOB/slice header into the PP buffer. The RTPU 112 then determines in step 520 if the SPE flag is "on." If the SPE flag is "on," then in step 525, the RTPU 112 writes the fields of the GOB/slice header to the secondary packet buffer, and the routine continues at step 315 in FIG. 3. However, if in step 520 the SPE flag is "off," then step 525 is bypassed, and the routine continues at step 315.

Alternatively, if in step 510, the primary packet buffer is ready to be sent, then in step 530, the RTPU 112 updates the SPE indication flag by sampling the SPE line 140 (FIG. 1). For example, if the field is from an Inter frame, and the SPE line 140 is high, then the RTPU 112 turns the SPE indication flag "on" upon sampling the SPE line 140. However, if the string is part of an Intra frame, or if the SPE line 140 is low, then the RTPU 112 turns the SPE indication flag "off" upon sampling the SPE line 140.

Subsequently in step 535, the RTPU 112 sends the data of the PP buffer as a PDC to the PDU 114, and releases the PP buffer. The RTPU 112 then allocates a new PP buffer in step 540. Next in step 545, the RTPU 112 determines if the secondary packet buffer is empty. If the secondary packet buffer is empty, then the method continues at step 515. However, if the secondary packet buffer is not empty, then in step 550, the RTPU 112 sends the data of the SP buffer as a SDC to the PDU 114, and releases the secondary packet buffer. In step 555, the RTPU 112 allocates a new secondary packet buffer and sets the start bit equal to the start bit of the associated PDC. The method then continues at step 515.

Figure 6:
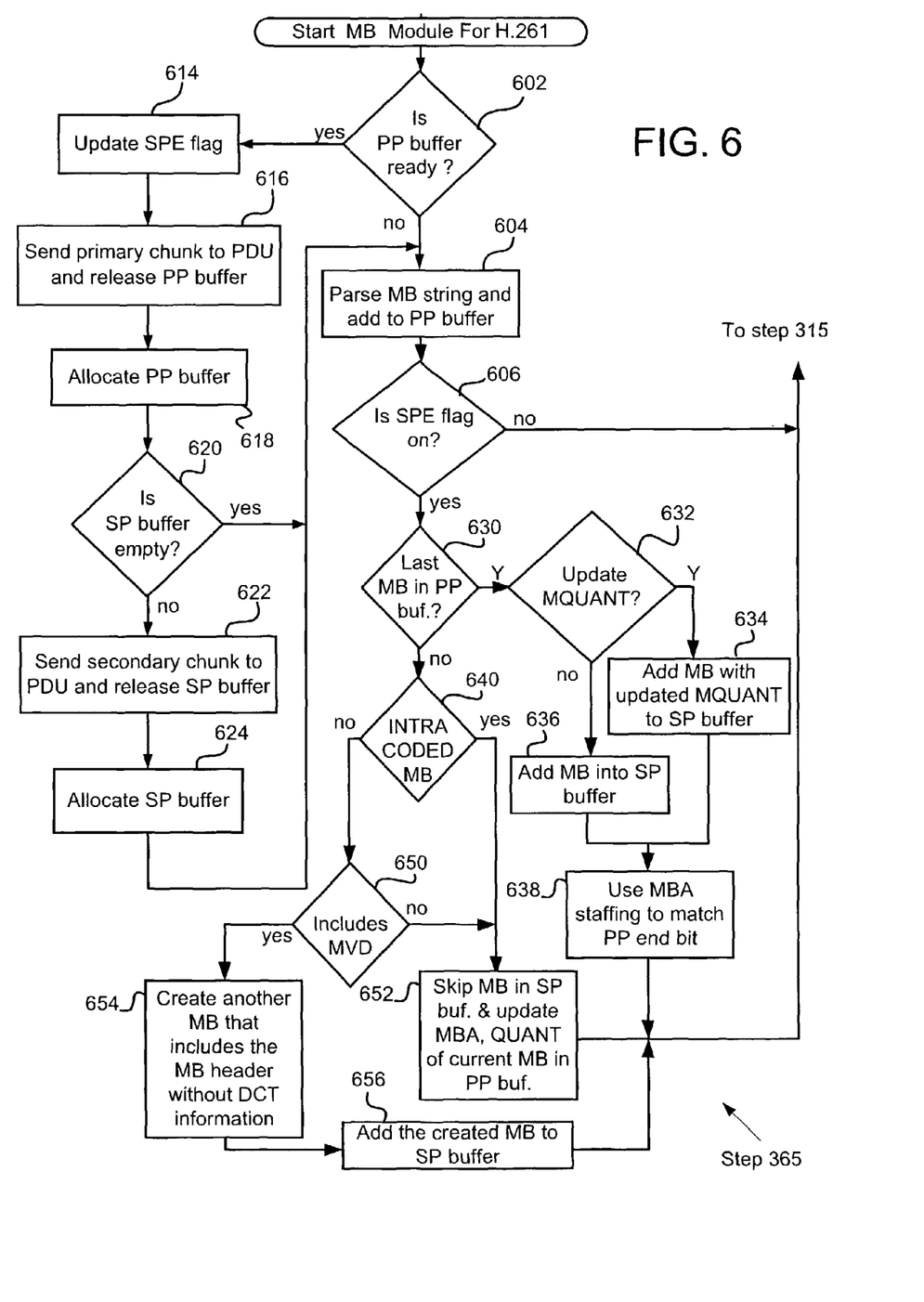
FIG. 6 is an exemplary flow diagram of method steps for executing the MB Routine of FIG. 3 for generating the secondary and primary data chunks, and sending the data chunks to the PDU of FIG. 1, when the compression standard is H.261.

FIG. 6 is an exemplary flow diagram of one embodiment of method steps for executing the MB module 365 of FIG. 3 for generating the secondary and primary data chunks when the communication compression standard is H.261. Another embodiment of method steps for executing the MB module 365 of FIG. 3 for generating secondary and primary data chunks when the compression standard is H.263 is discussed further below in conjunction with FIGS. 7A-7B.

Referring to FIG. 6, in step 602, the RTPU 112 (FIG. 1) determines if the primary packet buffer is ready to be sent. If the primary packet buffer is not ready to be sent, then in step 604, the RTPU 112 parses the string of the MB and adds it to the primary packet buffer. Subsequently in step 606, the RTPU 112 determines if the SPE flag is "on." If the SPE flag is "off," then a SDC is not generated, and the method continues at step 315 in FIG. 3. Conversely, if the SPE flag is "on," then in step 630, the RTPU 112 determines if the MB is the last MB in the PP Buffer (the last MB in the packet that comprises the PP buffer). The last MB in each SDC requires special handling in order for the SDC to match an associated PDC. The parameters in the last MB that need to be matched between the SDC and its associated PDC are: "end bit," MBA, and MQUANT. If in step 630, the RTPU 112 ascertains that the MB is the last MB in the PP buffer, then the RTPU 112 determines, in step 632, whether updating the MQUANT field in the last MB of the SDC is required to avoid quantizer mismatch for the next MBs in the stream, when the SDC replaces its associated PDC. If an update is required, then the MQUNT is updated and the MB is added to the SP buffer in step 634. Subsequently, in step 638, MBA staffing patterns are added to the SP buffer to match the "endbit" of the PP buffer. The method then continues at step 315 of FIG. 3. If, in step 632, there is no need to update the MQUANT, then the MB is added into the SP buffer in step 636. The method then continues at step 638.

Referring back to step 630, if the MB is not the last MB in the PP buffer, then the RTPU 112 determines whether the MB is an Intra coded MB in step 640. If the MB is an Intra coded MB, then in step 652, the RTPU 112 skips the MB in the SP buffer and saves the MBA and the QUANT of the recently added (current) primary MB. The method then continues at step 315 of FIG. 3. If in step 640 the MB is not an Intra coded MB, then the RTPU 112 determines whether the MB includes a MVD in step 650. If the MB includes a MVD, then in step 654 the RTPU 112 creates another MB that includes the MB header without the DCT information, and adds the created MB to the SP buffer in step 656. The method then continues at step 315 of FIG. 3. Referring back to step 650, if the MB does not include MVD data, then the method continues at step 652 as previously discussed.

Referring back to step 602, if the primary packet buffer is ready to be sent, then in step 614, the RTPU 112 updates the SPE indication flag by sampling the SPE line 140 (FIG. 1). For example, if the frame is an Inter frame, and the SPE line 140 is high, then the RTPU 112 turns the SPE indication flag "on" upon sampling the SPE line 140. However, if the frame is an Intra frame or the SPE line 140 is low, then the RTPU 112 turns the SPE indication flag "off" upon sampling the SPE line 140.

Next in step 616, the RTPU 112 sends a payload of the PP buffer as a primary data chunk to the PDU 114 (FIG. 1) and releases the primary packet buffer. Subsequently in step 618, the RTPU 112 allocates a new primary packet buffer. Next, in step 620, the RTPU 112 determines if the secondary packet buffer is empty. If the secondary packet buffer is empty, then the method continues at step 604. However, if the secondary packet buffer is not empty, then in step 622, the RTPU 112 sends a payload of the secondary packet buffer as a SDC to the PDU 114, and releases the secondary packet buffer. Finally, the RTPU 112 allocates a new secondary packet buffer in step 624 and sets the start bit equal to the start bit of the associated PDC. The method then continues at step 604.

Figure 7A:
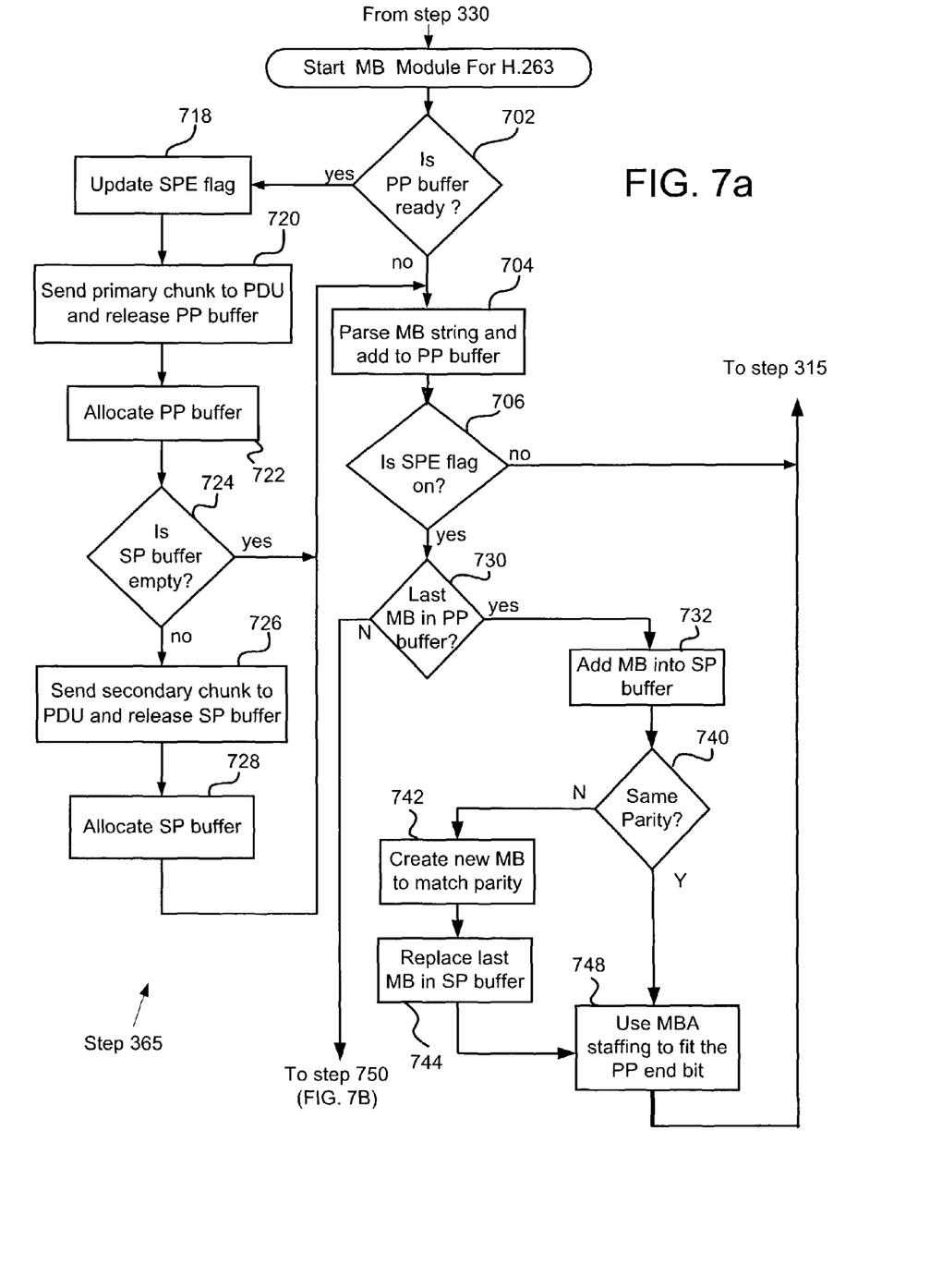
FIG. 7A is a flow diagram of method steps for executing the MB Routine of FIG. 3 for generating the secondary and primary data chunks, and sending the data chunks to the PDU of FIG. 1, when the compression standard is H.263, according to an alternate embodiment of the present invention.
Figure 7B:
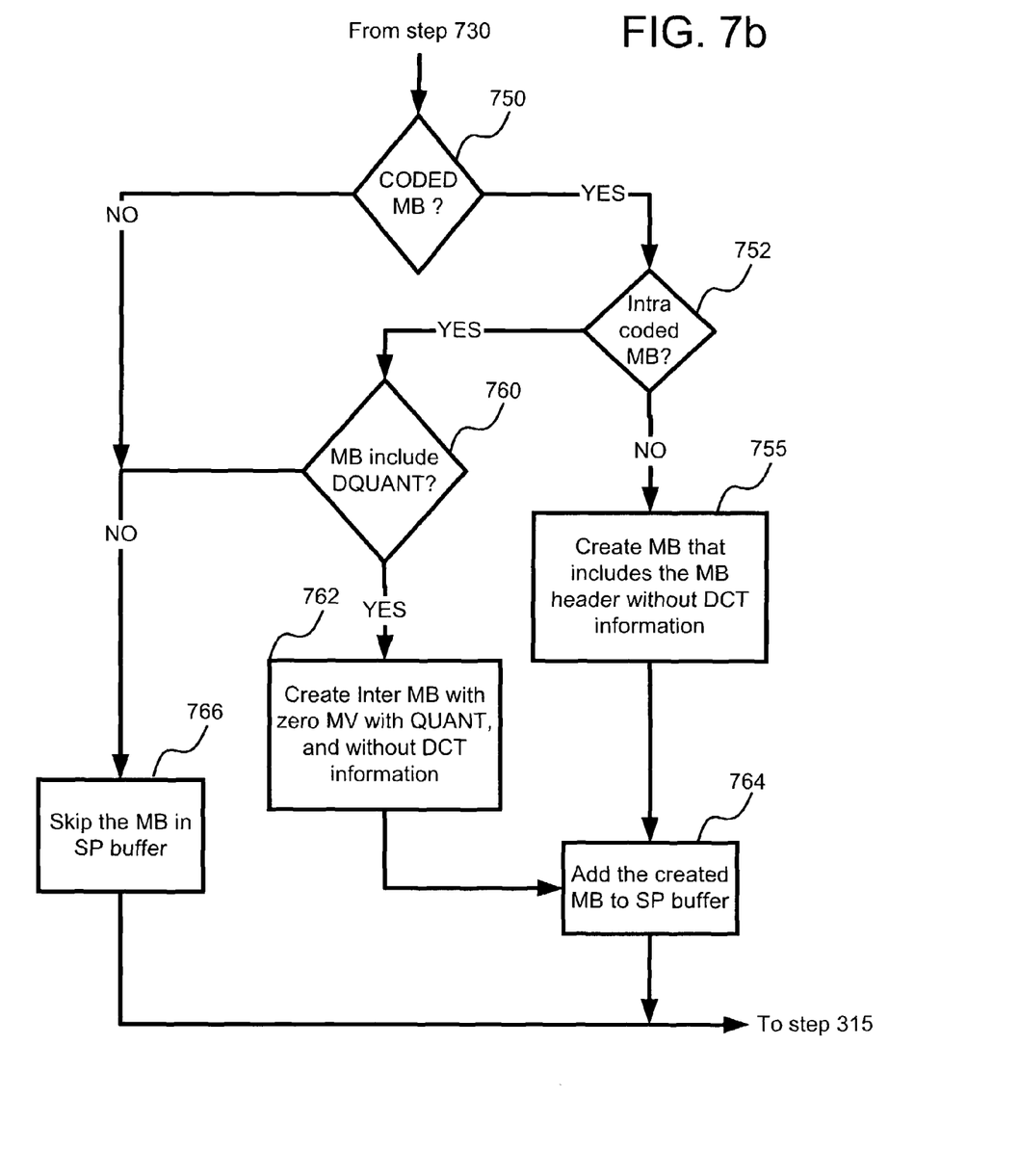
FIG. 7B is a continuation of the flow diagram of method steps for executing the MB routine of FIG. 7A, according to one embodiment of the present invention.

FIGS. 7A-7B are flow diagrams of method steps for an alternative embodiment of the MB module 365 of FIG. 3 for generating the secondary and primary data chunks when the communication compression standard is H.263, according to the present invention. Referring to FIG. 7A, the RTPU 112

(FIG. 1) determines if the primary packet buffer is ready to be sent in step 702. If the primary packet buffer is not ready to be sent, then in step 704, the RTPU 112 parses the string of the MB and adds it to the primary packet buffer. Next, in step 706, the RTPU 112 determines if an SPE flag is "on." If the SPE flag is "off", then a SDC is not generated, and the method continues at step 315 in FIG. 3. If the SPE flag is "on," then in step 730, the RTPU 112 determines if the MB is the last MB in the PP buffer. If the MB is the last MB in the PP buffer, then in step 732, the RTPU 112 adds the MB to the SP buffer and then determines, in step 740, whether the PP and the SP buffers have the same parity. If both buffers have the same parity, then in step 748, the RTPU 112 adds MBA staffing to the SP buffer to fit the PP buffer "end bit," and the method continues at step 315. However if in step 740 the buffers do not have the same parity, then in step 742 the RTPU 112 creates a new MB to match the parity of both data chunks. The new MB includes MV information and, if needed, a small value of a DC coefficient may be used in one of the blocks of the MB to match the parity. Then in step 744, the RTPU 112 replaces the last MB that has been added to the SP buffer in step 732 with the new MB. Subsequently, in step 748, MBA staffing is added to the SP buffer, and the method then continues at step 315.

Referring back to step 730, if the MB is not the last MB in the PP buffer, then the method continues at step 750 of FIG. 7B. Referring to FIG. 7B, in step 750 the RTPU 112 determines if the MB is a coded MB by checking the COD bit. If the MB is a coded MB, then in step 752, the RTPU 112 determines whether the MB is an Intra coded MB. If the MB is an Intra coded MB, then the RTPU 112 ascertains whether the MB includes a DQUANT in step 760. If the MB includes the DQUANT, then in step 762, the RTPU 112 creates an Inter MB to replace the Intra MB. The Inter MB has zero MV with QUANT, and is without DCT information. Subsequently, in step 764 the RTPU 112 adds the created MB to the SP buffer, and the method continues at step 315 of FIG. 3. Alternatively if, in step 752, the MB is not an Intra coded MB, then in step 755, the RTPU 112 creates a MB that includes the header of the MB without the DCT information, and the method continues at step 764.

Referring back to steps 750 and 760, if the MB is not a coded MB or the MB does not include the DQUANT, respectively, then in step 766, the RTPU 112 skips the MB in the SP buffer. Skipping a MB in H.263 means adding a COD bit in a high state to the SP buffer. The method continues at step 315 of FIG. 3.

Referring back to step 702 of FIG. 7A, if the primary packet buffer is ready to be sent, then the method continues at step 718, and proceeds through step 728. Steps 718-728 are the same as steps 614-624 of FIG. 6, and will not be discussed in any further details.

The above methods illustrate how exemplary embodiments of the present invention generate associated primary-secondary data chunks that cover the same portion of a video frame. Each secondary data chunk has the same frame and GOB headers as its associated primary data chunk, and each secondary data chunk has modified versions of its associated primary data chunk's MB header and MB data.

Those skilled in the art will appreciate that the present invention may be implemented with software, hardware, or firmware. For example, the present invention may be implemented by application software residing in a processor of the RTPU 112 (FIG. 1), or by a dedicated RTPU processor configured to implement the methods of the present invention. Furthermore, those skilled in the art will appreciate that it is not mandatory that the present invention be part of an network interface logical unit. It can be located in other parts of the system.

In the description and claims of the present application, each of the verbs, "comprise," "include," and "have," and conjugates thereof, are used to indicate that the object or objects of the verb are not necessarily a complete listing of members, components, elements, or parts of the subject, or subjects, of the verb.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for improving quality of video communication over a packet-based network, comprising:
    a packets generator logical unit (PGU) coupled to a video source for receiving a compressed video stream and processing the compressed video stream to generate a stream of primary data chunks and a stream of secondary data chunks, each secondary data chunk associated with a primary data chunk, and to generate packets from the stream of primary data chunks and secondary data chunks; and
    a network controller coupled to the PGU and coupled to the packet-based network for sending the packets to one or more destination nodes,
    wherein the PGU delays sending each secondary data chunk with respect to its associated primary data chunk,
    wherein each secondary data chunk contains data corresponding to at least a portion of a video frame covered by the corresponding primary data chunk, and
    wherein the secondary data chunk is delayed such that it arrives at the one or more destination nodes after the associated primary data chunk but before a declaration by the one or more destination nodes that the associated primary data chunk is lost.

2. The system of claim 1, wherein video data included in each secondary data chunk and video data included in each associated primary data chunk cover a same portion of a video frame.

3. The system of claim 1, wherein the PGU further comprises a real time protocol logical unit (RTPU) for generating the primary data chunks and the secondary data chunks according to a communication standard.

4. The system of claim 1, wherein the PGU further comprises a packet delivery unit (PDU) for adding identification data to each primary data chunk and secondary data chunk, each associated primary-secondary data chunk pair having identical identification data.

5. The system of claim 4, wherein the identification data comprises at least one type of data from a group consisting of a sequence number and a time stamp.

6. The system of claim 1, wherein the PGU delays each secondary data chunk with respect to its associated primary data chunk by a period T, the period T derived from a jitter period of the one or more destination nodes.

7. The system of claim 1, wherein the PGU delays each secondary data chunk with respect to its associated primary data chunk by an integer number of primary data chunks.

8. The system of claim 1, wherein the PGU delivers each primary data chunk as a primary packet and each delayed secondary data chunk as a secondary packet to the network controller for transmission to the one or more destination nodes.

9. The system of claim 8, wherein the one or more destination nodes process each delayed secondary packet if an associated primary packet is not received.

10. The system of claim 1, wherein the PGU builds a compound packet from a primary data chunk and a non-associated delayed secondary data chunk, and delivers the compound packet to the network controller for transmission to the one or more destination nodes.

11. The system of claim 10, wherein the one or more destination nodes are configured to process a secondary data chunk of a second compound packet if a first compound packet with an associated primary data chunk is not received.

12. The system of claim 1, wherein the PGU and the network controller are comprised within an endpoint.

13. The system of claim 1, wherein the PGU and the network controller are comprised within a multipoint control unit.

14. The system of claim 1, wherein the PGU and the network controller are comprised within a multimedia gateway.

15. The system of claim 1, wherein each secondary data chunk comprises at least one type of data from a group consisting of a frame header, a GOB header, a slice header, a modified macro block header, an Intra MB, and macro blocks having only motion vector data.

16. The system of claim 1, wherein the PGU generates the secondary data chunks if a packet loss rate as measured at the one or more destination nodes exceeds a predefined threshold value.

17. The system of claim 3, wherein the communication standard is H.323.

18. The system of claim 3, wherein the communication standard is SIP.

19. The system of claim 1, wherein the compressed video stream is compressed according to the H.261 compression standard.

20. The system of claim 1, wherein the compressed video stream is compressed according to the H.263 compression standard.

21. A method for improving quality of video communication, comprising the steps of:
receiving a compressed video stream, the compressed video stream having a plurality of fields;
parsing the plurality of fields from the compressed video stream and determining field types;
generating secondary data chunks and primary data chunks based on the field types, each secondary data chunk associated with a primary data chunk;
delaying each secondary data chunk with respect to its associated primary data chunk;
generating packets from the delayed secondary data chunks and primary data chunks; and
sending the packets to one or more destination nodes,
wherein each secondary data chunk contains data corresponding to at least a portion of a video frame covered by the corresponding primary data chunk, and
wherein the secondary data chunk is delayed such that it arrives at the one or more destination nodes after the associated primary data chunk but before a declaration by the one or more destination nodes that the associated primary data chunk is lost.

22. The method of claim 21, wherein video data included in each secondary data chunk and video data included in each associated primary data chunk cover a same portion of a video frame.

23. The method of claim 21, further comprising the step of adding identification data to each primary data chunk and secondary data chunk, each associated primary-secondary data chunk pair having identical identification data.

24. The method of claim 21, wherein the step of generating packets from the delayed secondary data chunks and primary data chunks further comprises the step of generating a secondary packet from each delayed secondary data chunk and a primary packet from each primary data chunk, each secondary packet associated with a primary packet.

25. The method of claim 24, further comprising the step of processing the secondary packet for use in video communication if the associated primary packet is not received by the one or more destination nodes.

26. The method of claim 21, wherein the step of generating packets from the delayed secondary data chunks and primary data chunks further comprises the step of building a compound packet from a primary data chunk and a delayed secondary data chunk, the delayed secondary data chunk not associated with the primary data chunk.

27. The method of claim 26, wherein the one or more destination nodes are configured to process a delayed secondary data chunk of a second compound packet if a first compound packet with an associated primary data chunk is not received.

28. The method of claim 21, wherein the step of parsing the plurality of fields further comprises the steps of:
synchronizing on a Picture Start Code (PSC) field from the compressed video stream; and parsing fields subsequent to the PSC field for field type.

29. The method of claim 21, wherein the step of generating secondary data chunks and primary data chunks based on the field type further comprises executing an MB module for generating the secondary and primary data chunks, if the field type is a MB field.

30. The method of claim 21, wherein the step of generating secondary data chunks and primary data chunks based on the field type further comprises executing a frame header module for generating the secondary and primary data chunks, if the field type is a picture header field.

31. The method of claim 21, wherein the step of generating secondary data chunks and primary data chunks based on the field type further comprises executing a GOB/slice header module for generating the secondary and primary data chunks, if the field type is a GOB or slice header field.

32. The method of claim 21, wherein the step of generating secondary data chunks and primary data chunks based on the field type further comprises generating secondary data chunks only if a packet loss rate as measured at the one or more destination nodes exceeds a predefined threshold value.

33. An electronic-readable medium having embodied thereon a program, the program being executable by a machine to perform method steps for improving quality of video communication, the method steps comprising:
receiving a compressed video stream, the compressed video stream having a plurality of fields;
parsing the plurality of fields from the compressed video stream and determining field types;
generating secondary data chunks and primary data chunks based on the field types, each secondary data chunk associated with a primary data chunk;
delaying each secondary data chunk with respect to its associated primary data chunk;
generating packets from the delayed secondary data chunks and primary data chunks; and
sending the packets to one or more destination nodes, wherein each secondary data chunk contains data corresponding to at least a portion of a video frame covered by the corresponding primary data chunk, and wherein the secondary data chunk is delayed such that the packet generated from a secondary data chunk arrives at the one or more destination nodes after the packet generated from the associated primary data chunk but before a declaration by the one or more destination nodes that the packet generated from the associated primary data chunk is lost.

34. The electronic-readable medium of claim 33, further comprising the step of adding identification data to each primary data chunk and secondary data chunk, each associated primary-secondary data chunk pair having identical identification data.

35. The electronic-readable medium of claim 33, wherein the step of generating packets from the delayed secondary data chunks and primary data chunks further comprises the step of generating a secondary packet from each delayed secondary data chunk and a primary packet from each primary data chunk, each secondary packet associated with a primary packet.

36. The electronic-readable medium of claim 35, further comprising the step of processing the secondary packet for use in video communication if the associated primary packet is not received by the one or more destination nodes.

37. The electronic-readable medium of claim 33, wherein the step of generating packets from the delayed secondary data chunks and primary data chunks further comprises the step of building a compound packet from a primary data chunk and a delayed secondary data chunk, the delayed secondary data chunk not associated with the primary data chunk.

38. The electronic-readable medium of claim 37, wherein the one or more destination nodes are configured to process a delayed secondary data chunk of a second compound packet if a first compound packet with an associated primary data chunk is not received.

39. The electronic-readable medium of claim 33, wherein the step of generating secondary data chunks and primary data chunks based on the field type further comprises generating secondary data chunks only if a packet loss rate as measured at the one or more destination nodes exceeds a predefined threshold value.

40. A system for improving quality of video communication, comprising:

means for receiving a compressed video stream, the compressed video stream having a plurality of fields;

means for parsing the plurality of fields from the compressed video stream and determining field types;

means for generating secondary data chunks and primary data chunks based on the field types, each secondary data chunk associated with a primary data chunk;

means for delaying each secondary data chunk with respect to its associated primary data chunk;

means for generating packets from the delayed secondary data chunks and primary data chunks; and means for sending the packets to one or more destination nodes, wherein each secondary data chunk contains data corresponding to at least a portion of a video frame covered by the corresponding primary data chunk, and wherein the secondary data chunk is delayed such that it arrives at the one or more destination nodes after the associated primary data chunk but before a declaration by the one or more destination nodes that the associated primary data chunk is lost.

* * * * *